(12) United States Patent
Neumeier et al.

(10) Patent No.: US 7,090,290 B2
(45) Date of Patent: Aug. 15, 2006

(54) MOTOR VEHICLE

(75) Inventors: Franz-Xaver Neumeier, Ampfing (DE); Juergen Schippan, Kirchseeon (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 24 days.

(21) Appl. No.: 10/952,431

(22) Filed: Sep. 29, 2004

(65) Prior Publication Data

US 2005/0110303 A1    May 26, 2005

Related U.S. Application Data

(63) Continuation of application No. PCT/EP03/02116, filed on Mar. 1, 2003.

(30) Foreign Application Priority Data

Mar. 30, 2002 (DE) ................................ 102 14 372

(51) Int. Cl.
*B62D 21/00* (2006.01)
(52) U.S. Cl. .................. 296/204; 296/203.04; 280/793
(58) Field of Classification Search ................ 296/205, 296/204, 203.02, 203.04; 280/793, 794
See application file for complete search history.

(56) References Cited

U.S. PATENT DOCUMENTS 2,212,636 A * 8/1940 Dorris ........................... 280/2
2,337,281 A * 12/1943 Sherman ....................... 280/794
2,820,645 A * 1/1958 Schilberg ..................... 280/794
5,074,587 A * 12/1991 Schwede et al. ............. 280/781

FOREIGN PATENT DOCUMENTS

| DE | 634 467 | 8/1936 |
| DE | 39 05 650 C1 | 2/1989 |
| DE | 39 42 794 A1 | 12/1989 |
| DE | 295 20 166 U1 | 12/1995 |
| DE | 100 23 110 A1 | 5/2000 |
| DE | 100 59 261 A1 | 11/2000 |
| DE | 102 14 372 C1 | 3/2002 |
| EP | 0 603 536 A1 | 11/1993 |
| EP | 0 603 536 B1 | 11/1993 |
| FR | 1.483.189 | 6/1966 |

OTHER PUBLICATIONS

International Search Report, Mar. 30, 2002.

* cited by examiner

*Primary Examiner*—Joseph D. Pape
(74) *Attorney, Agent, or Firm*—Crowell & Moring LLP

(57) ABSTRACT

A motor vehicle in which a floor of the body is reinforced by reinforcing struts arranged in V shapes, in which a body with a high rigidity is achieved by mounting the rear end-area ends of rear reinforcing struts arranged in a V-shape on a connecting area on the bottom of the vehicle rear end, where the ends of two other rear end-area reinforcing struts that run in a V shape are arranged, and by mounting the rear end area of the two other reinforcing struts so they run obliquely to the rear in the direction of a rear end of the vehicle and obliquely toward the outside in the direction of rear chassis beam members, with the rear ends of the other reinforcing struts being mounted on the rear chassis beam members.

7 Claims, 3 Drawing Sheets

MOTOR VEHICLE

This application claims the priority of 102 14 372.2, filed Mar. 30, 2002, and is a Continuation of PCT Application No. PCT/EP03/02116 filed on Mar. 1, 2003, the disclosure of which is expressly incorporated by reference herein.

BACKGROUND AND SUMMARY OF THE INVENTION

This invention relates to a motor vehicle body, and in particular arrangements of body reinforcing members.

German Patent DE 39 05 650 has already disclosed a motor vehicle having a self-supporting body, whereby reinforcing struts arranged in a V pattern are provided on the underside of the floor to reinforce the body, converging in the direction of the rear end and the front end of a vehicle. Due to the V-shaped arrangement of the reinforcing struts on the floor pan of the body, the torsion amplitudes on the body are reduced due to the increased torsional rigidity of the body.

European Patent EP 603 536 B1 discloses another motor vehicle with which a first V-shaped reinforcing strut runs in a horizontal plane on the floor pan. A second V-shaped reinforcing strut is arranged in a vertical transverse plane. The first V-shaped reinforcing strut is connected directly to the second V-shaped reinforcing strut at the converging ends of the reinforcing strut in the area of the rear end. The free ends of the two V-shaped reinforcing struts are attached to chassis beam members which run beneath the passenger compartment as well as beneath the rear end. The reinforcing struts also serve to increase the torsional rigidity of the body.

The object of this invention is to create a motor vehicle having a body with a high rigidity.

This object is achieved through the features of the present invention, wherein the rear end-area ends of rear reinforcing struts are mounted on a connecting area on the bottom of the vehicle rear end, the ends of two other rear end-area reinforcing struts that run in a V shape also are arranged on the connecting area and the two other reinforcing struts run obliquely toward the rear and obliquely toward the outside in the direction of rear chassis beam members, and with the rear ends of the other reinforcing struts being mounted on the rear chassis beam members.

Due to the inventive reinforcement of the body on the floor pan of the present invention, the torsional rigidity and the flexural rigidity are both increased. The inventive reinforcement can be used to advantage in an open vehicle such as a convertible or a roadster as well as in closed vehicles, in particular station wagons and vehicles without a B pillar.

The inventive reinforcement of two reinforcing struts running in a V shape, attached to the vehicle body at their converging ends, has five points of connection to the vehicle. In an advantageous embodiment, a component suitable for introducing and distributing force is mounted on the bottom of the vehicle body. The inventive reinforcement yields an increase in the torsional rigidity as well as the flexural rigidity of the body by a simple method.

In an advantageous embodiment, the rear chassis beam members on the rear end of the vehicle run at an offset height with respect to the lower outer chassis beam members situated beneath the passenger compartment. The joint connection area of the two reinforcing struts is below the rear chassis beam members. In an advantageous embodiment, the common connecting area is located at the spare tire well or some other lower body part in the rear end. Due to this arrangement, the inventive reinforcement has a three-dimensional X shape. This design has the advantage that a space for arranging components, e.g., the rear axle, is still available in front of the spare tire well and/or the floor in the rear end.

In one embodiment, in addition to the rear X-shaped reinforcement in the rear end of the vehicle, a front vehicle reinforcement is advantageously provided, in which two reinforcing struts run in a V shape in the direction of the front end of the vehicle. The front end of the body is also reinforced due to the additional front reinforcing struts which lie approximately in a horizontal plane.

Other objects, advantages and novel features of the present invention will become apparent from the following detailed description of the invention when considered in conjunction with the accompanying drawings.

DETAILED DESCRIPTION

Figure 1:
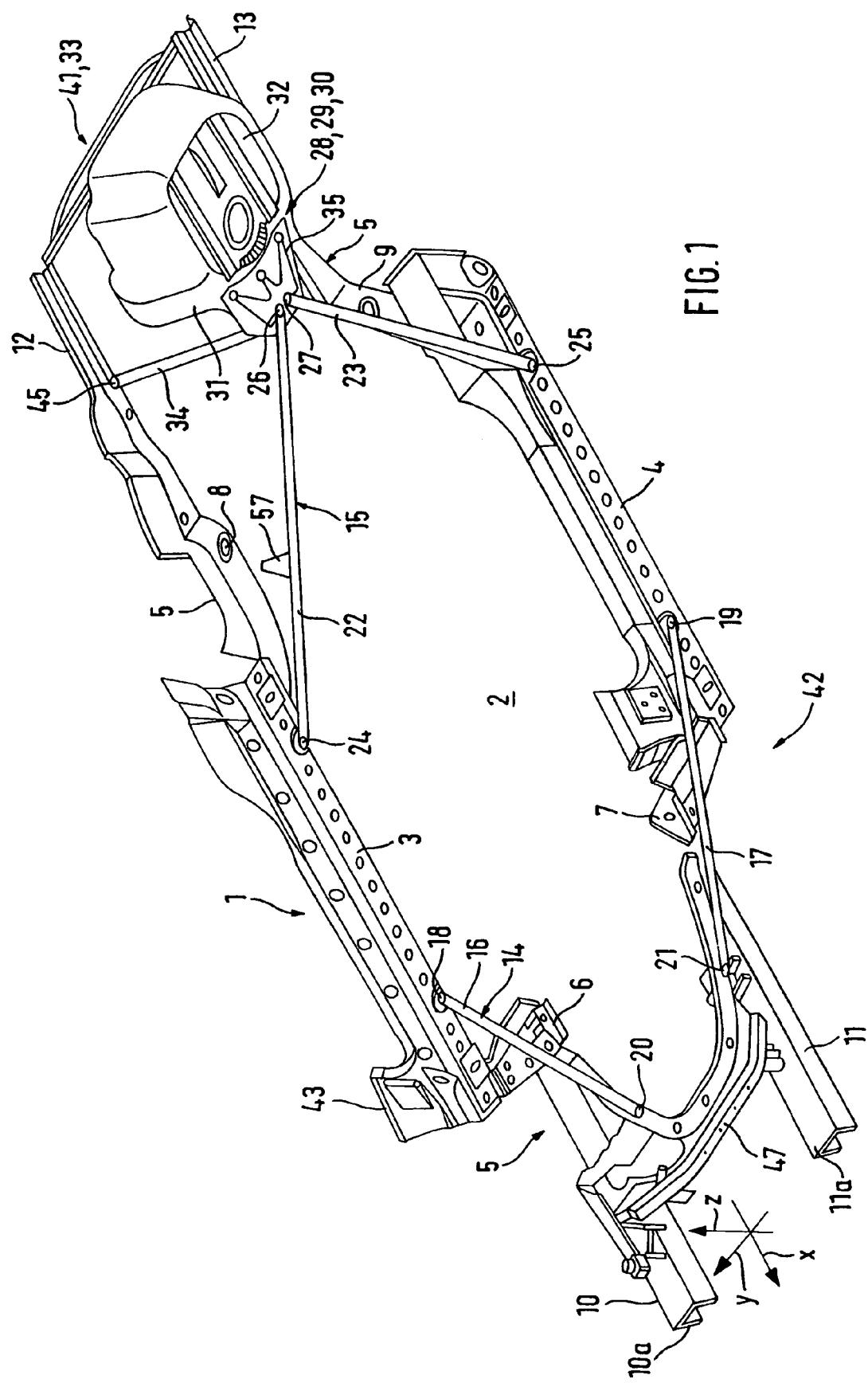
FIG. 1 shows a perspective partial view from underneath the bottom of a vehicle in accordance with an embodiment of the present invention.

FIG. 1 shows a partial view of the bottom 2 of a motor vehicle 1. Beneath a passenger compartment 43, which is shown only partially, there run two outer chassis beam members or rocker panels 3, 4 that run parallel to one another. At the height of wheel housings 5 (not shown further here) there are front and rear offsets 6, 7 and 8 and 9 connecting outer chassis beam members 3, 4 to front and rear chassis beam members 10, 11 and 12, 13.

The front chassis beam members 10, 11 are designed as engine mounts in the embodiment shown here, the free front ends 10a and 11a ending in the vehicle front end 42 while the opposite ends 10b and 11b of chassis beam members 10, 11 are mounted to the floor 2 of the passenger compartment 43. In the embodiment shown here, a front axle mount 47 or the like is bolted securely to the chassis beam members 10, 11; this front axle support is U shaped as seen from above. The rear chassis beam members 12, 13 are designed in the rear end 41 of the vehicle.

The embodiment shown in FIG. 1, a front V-shaped reinforcement 14 running approximately horizontally and a rear X-shaped reinforcement 15 are provided. The front V-shaped reinforcement 14 consists of two reinforcing struts 16, 17 which are attached to the outer chassis beam members 3, 4 with their rear ends 18, 19 as seen with respect to the longitudinal direction X of the vehicle. The front ends 20, 21 of the reinforcing struts 16, 17 are mounted on the permanently bolted front axle support 47.

The rear X-shaped reinforcement 15 has two V-shaped reinforcing struts 22, 23 running in a horizontal plane X-Y. The front free ends 24, 25 of the reinforcing struts 22, 23 are attached to the outer chassis beam members 3, 4. The rear ends 26, 27 of the reinforcing struts 22, 23 are attached to a common fastening point 30 via an additional component 29 at the bottom 28 of the vehicle rear end 41 in the embodiment shown here. This yields three connection points for the reinforcing struts 22, 23 on the body of the vehicle 1.

In the present embodiment, the fastening point 30 is in front of a front wall 31 of a spare tire well 32. Two reinforcing struts 34, 35 toward the rear end run obliquely outward from the additional component 29 and obliquely to the rear in the direction of the rear end 33 of the vehicle rear end 41 in a V shape, as shown in particular in the view from above in FIG. 2. In addition, the lower ends 37, 38 of the reinforcing struts 34, 35 on the end at the rear are also fastened to the connection area 30. The upper ends 45, 46 of the reinforcing struts 34, 35 toward the rear end are attached to rear chassis beam members 12, 13 so that this yields on the whole five fastening points for the reinforcing struts 22, 23 and 34, 35 with the bottom 2 of the body of the vehicle 1.

Figure 2:
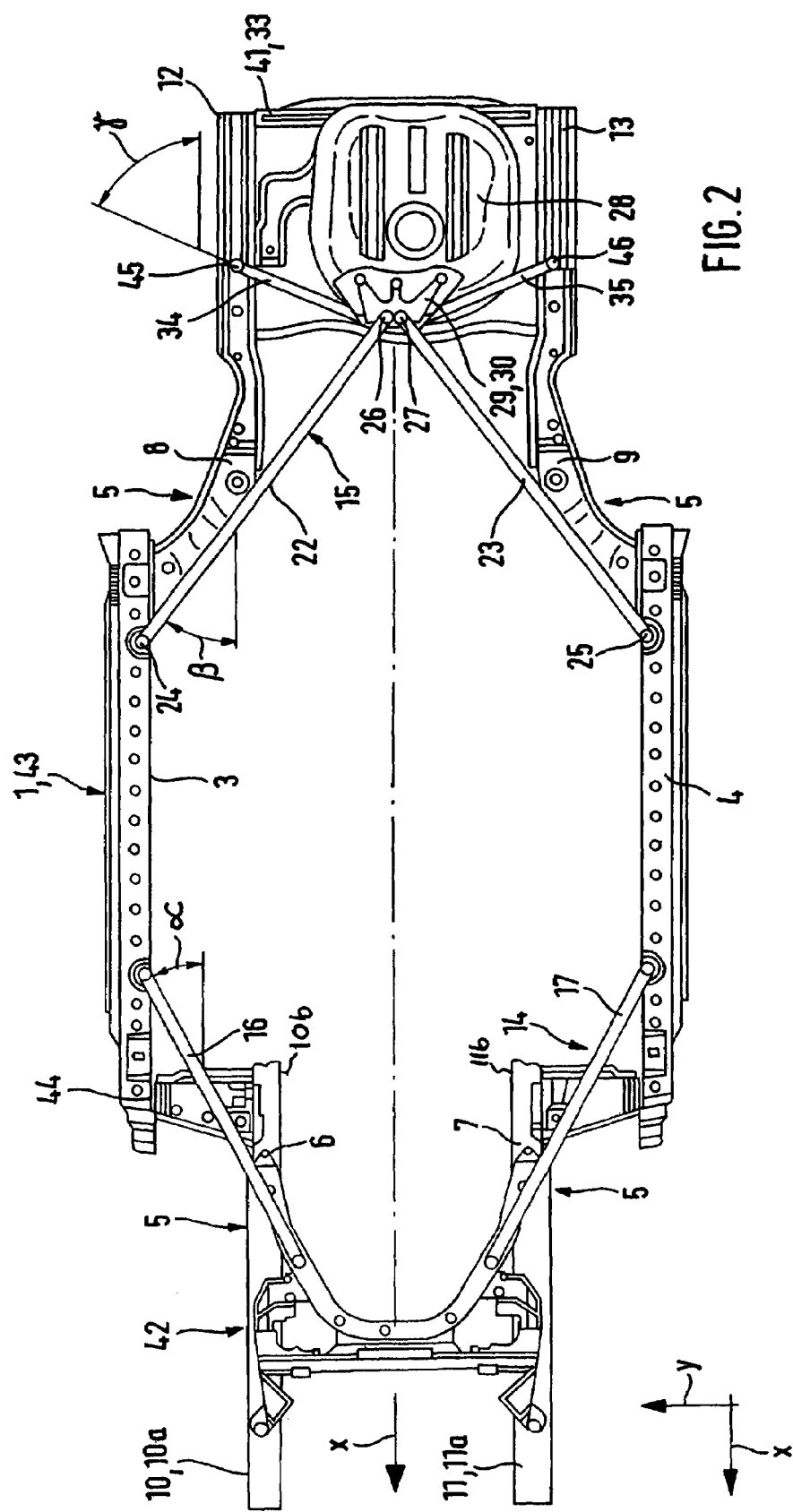
FIG. 2 shows a view of the bottom of the vehicle shown in FIG. 1.

Angles $\alpha$, $\beta$ and $\gamma$ are discernible in the view from above in FIG. 2. The front reinforcing struts 16, 17 of the front V-shaped reinforcement 14 and the rear reinforcing struts 22, 23 and the reinforcing struts 34, 35 in the rear end area of the rear reinforcement 15 run at these angles with respect to the longitudinal direction X of the vehicle. In an advantageous embodiment, the angle $\alpha$=approx. $23°\pm30°$, the angle $\beta=36°\pm3°$ and the angle $\gamma=67°\pm3°$.

Figure 3:
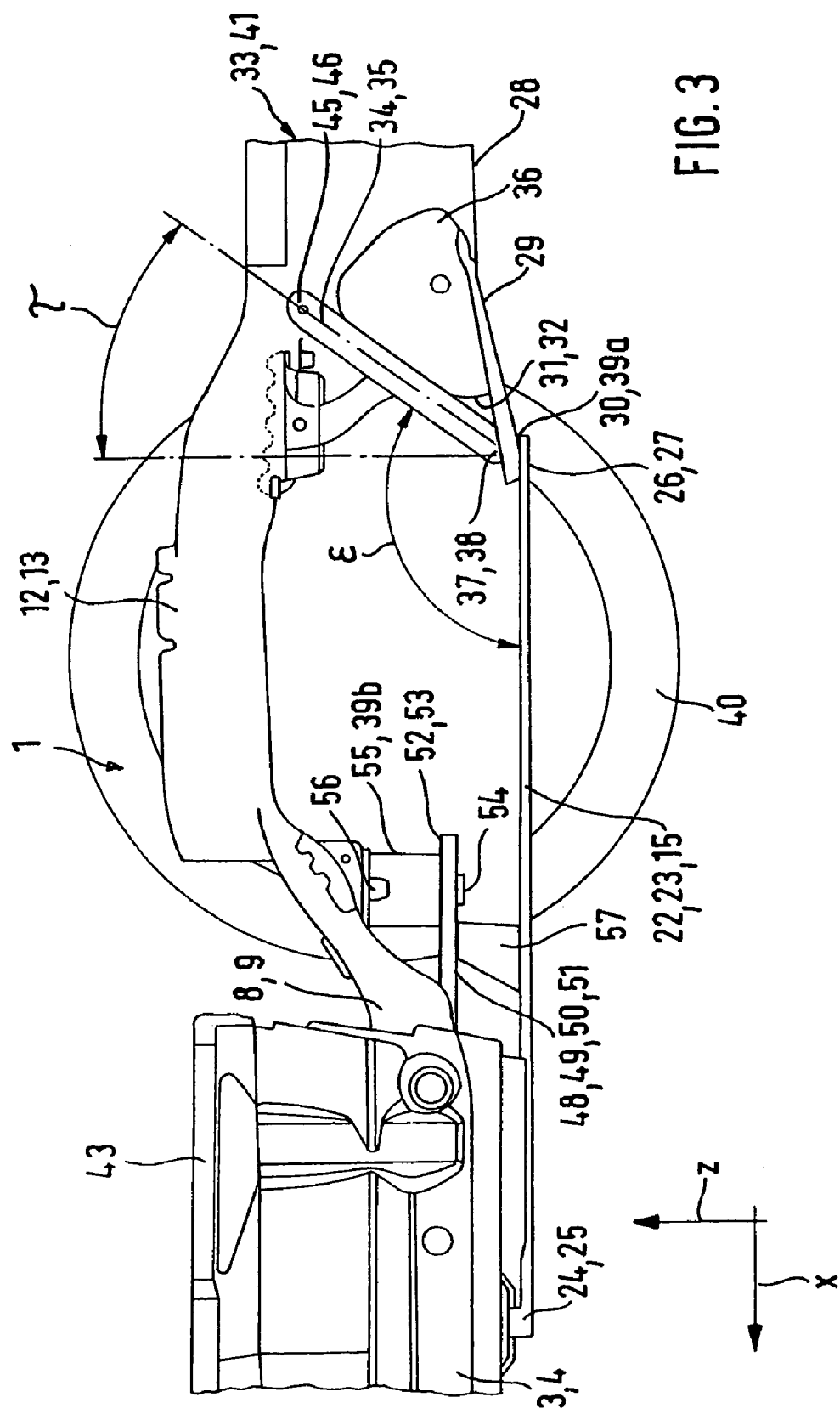
FIG. 3 shows a partial view from the side of a rear end area of the vehicle shown in FIG. 1.

In the side view in FIG. 3, the horizontal design of the rear V-shaped reinforcing struts 22, 23 in the X-Y plane is emphasized. The reinforcing struts 34, 35 running in the form of a V in the rear end area are inclined by an angle $\tau$ in the direction of the rear end 33 of the vehicle 1 with respect to a vertical line in the Z-Y plane, with the angle $\tau$ amounting to approx. $37° \pm3°$. This yields an angle $\epsilon$ between the horizontal reinforcing struts 22, 23 and the reinforcing struts 34, 35 which run obliquely upward amounting to $\epsilon$=approx. $125°\pm3°$.

FIG. 3 also shows that a well-shaped reinforcing component 36 is situated behind the rear-end reinforcing struts 34, 35; the reinforcing component surrounds the spare tire well 32 for optimum induction of force. The connecting area 30 to which the rear ends 26, 27 of the reinforcing struts 22, 23 and the rear ends 37, 38 of the reinforcing struts 34, 35 in the rear end area are attached is at the level of a rear area 39a of the rear wheels 40 of the motor vehicle 1.

Struts 48, 49 extending in the longitudinal direction X of the vehicle are mounted at their one end 50, 51 beneath the bends 8 and 9 on both sides in a front area 39b of the rear wheels 40 of the motor vehicle 1. The free end 52, 53 of the struts 48, 49 serves as the lower fastening point 54 of a rubber bearing 55 or the like. At its upper end 56, the respective rubber bearing 55 is attached to the opposing rear chassis beam members 12, 13. The reinforcing struts 22, 23 that run horizontally are connected via a connecting element 57 to one of the adjacent struts 48, 49. This yields an increase in the rigidity of the reinforcing struts 22, 23.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a self-supporting body, comprising:
    a passenger compartment,
    a floor,
    chassis beam members running on the floor of the body and extending from a vehicle front end past the passenger compartment to a vehicle rear end,
    two rear reinforcing struts arranged in a V pattern, each rear reinforcing strut attached at a front end to one of said chassis beam members running beneath the passenger compartment in a rear half of the vehicle, and at a rear end on a bottom of the vehicle rear end,
    wherein the two rear reinforcing struts are arranged approximately in a horizontal plane, and
    wherein the rear ends of the rear reinforcing struts are mounted at a connecting area on the bottom of the vehicle rear end,
    further comprising two other reinforcing struts running in a V shape,
    wherein the two other reinforcing struts are each mounted at an inner end at the connecting area on the bottom of the vehicle rear end and at an outer end on the rear chassis beam members, and
    wherein the two other reinforcing struts run from the bottom of the vehicle rear end to the rear chassis beam members at an angle relative to the horizontal plane, and each of the two other reinforcing members is disposed at an oblique angle relative to a longitudinal axis of the vehicle and at an oblique angle relative to a transverse axis of the vehicle.

2. Motor vehicle as claimed in claim 1, wherein the rear reinforcing struts and the other reinforcing struts together form an X-shaped reinforcement having five mounting points with the bottom of the vehicle.

3. Motor vehicle as claimed in claim 1, wherein the rear chassis beam members run at an offset height with respect to the chassis beam members.

4. Motor vehicle as claimed in claim 1, wherein a front V-shaped reinforcement is provided, extending between a front end of the passenger compartment into the front end of the vehicle, the front V-shaped reinforcement having front reinforcing struts, each of the front reinforcing struts being mounted at a rear end on one of the chassis beam members and at a front end on a permanent portion of the vehicle front end.

5. Motor vehicle as claimed in claim 4, wherein the front struts, rear struts and other reinforcing struts near the rear end are arranged in the horizontal plane such that
    an angle between the respective front reinforcing struts and a longitudinal axis of the vehicle has a value of approximately $23°\pm3°$,
    an angle between the rear reinforcing struts and the longitudinal axis has a value of approximately $36°\pm3°$, and
    an angle between the respective other reinforcing struts and the longitudinal axis of the vehicle has a value of approximately $67°\pm3°$.

6. Motor vehicle as claimed in claim 1, wherein the rear reinforcing struts and the other reinforcing struts form a rear X-shaped reinforcement, an angle between a transverse vertical plane of the vehicle and the other reinforcing struts has a value of approximately $37°\pm3°$, and an angle formed between the rear reinforcing struts and the other reinforcing struts has a value of approximately $125°\pm3°$.

7. Motor vehicle as recited in claim 1, wherein the rear reinforcing struts are each supported by at least one connecting element between their respective laterally outboard ends and the bottom of a vehicle.

* * * * *